United States Patent [19]

McFalls et al.

[11] Patent Number: 4,616,875
[45] Date of Patent: Oct. 14, 1986

[54] ADJUSTABLE SEAT CONSTRUCTION

[75] Inventors: Bob L. McFalls, Roseville; William R. Tighe, Dearborn, both of Mich.

[73] Assignee: Ferro Manufacturing Corporation, Southfield, Mich.

[21] Appl. No.: 542,458

[22] Filed: Oct. 17, 1983

[51] Int. Cl.[4] .................... A47C 3/20; F16M 13/00
[52] U.S. Cl. ................................ 297/325; 248/394; 297/366
[58] Field of Search ............... 297/313, 320, 321, 325, 297/338, 345, 346, 366, 367; 248/390, 394, 396, 418, 420

[56] References Cited

U.S. PATENT DOCUMENTS

| 3,662,984 | 5/1972 | Robinson et al. ............... 248/394 |
| 4,190,225 | 2/1980 | Bauer et al. .................... 248/394 |
| 4,394,048 | 7/1983 | Sakurai et al. ................ 297/379 X |
| 4,406,497 | 9/1983 | Kluting .......................... 297/366 |

FOREIGN PATENT DOCUMENTS

| 653047 | 11/1962 | Canada ......................... 297/344 |
| 29997 | 6/1981 | European Pat. Off. ........ 297/325 |
| 2349486 | 4/1975 | Fed. Rep. of Germany .... 297/367 |
| 2605522 | 8/1977 | Fed. Rep. of Germany .... 297/367 |
| 2378649 | 9/1978 | France .......................... 297/344 |

Primary Examiner—William E. Lyddane
Assistant Examiner—Peter R. Brown
Attorney, Agent, or Firm—Stephenson an dBoller

[57] ABSTRACT

A six-way vehicle seat having means providing for fore and aft adjustment, vertical adjustment with tilting, and a recliner back with full adjustment.

4 Claims, 11 Drawing Figures

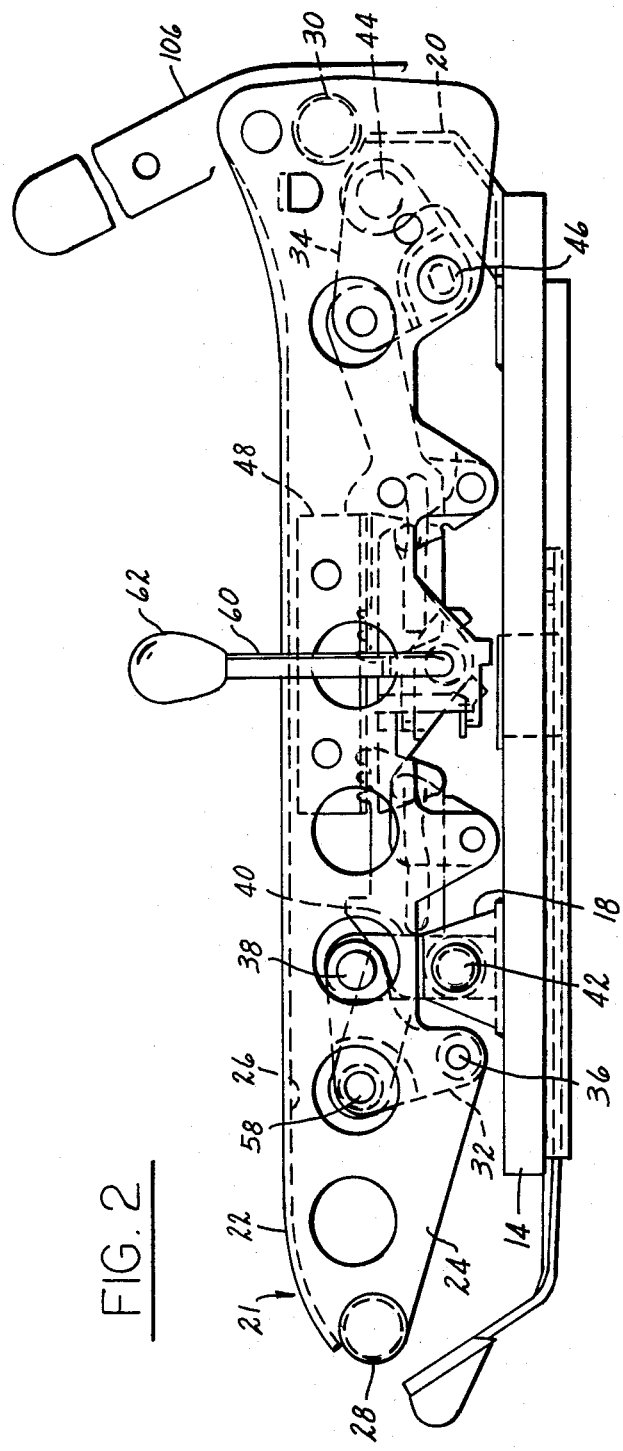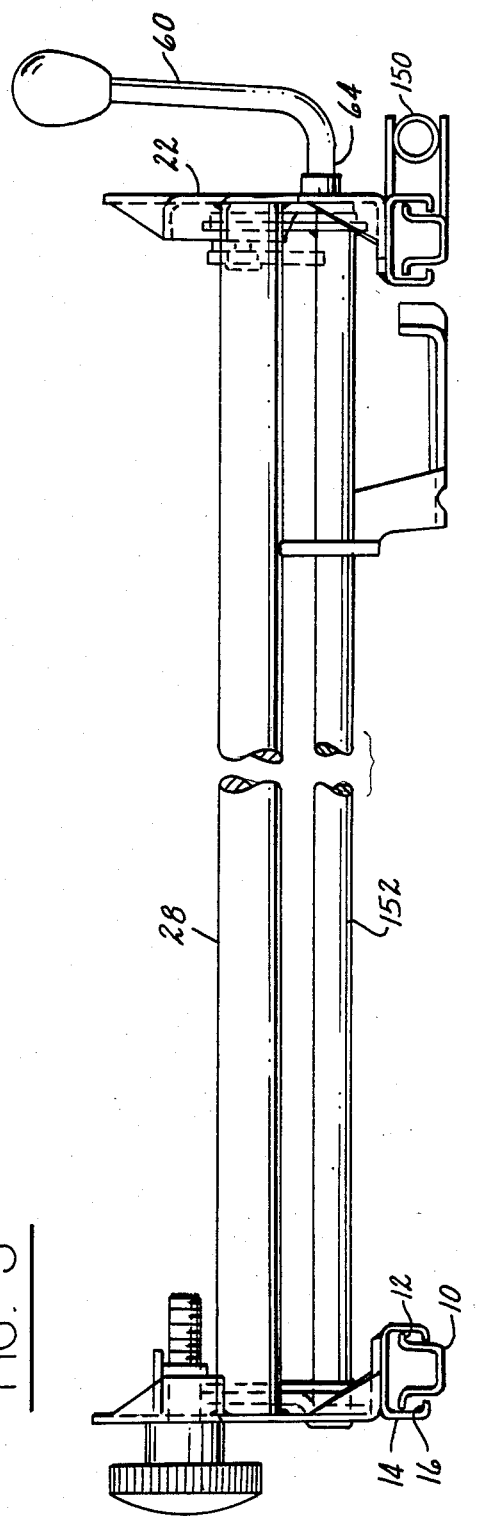

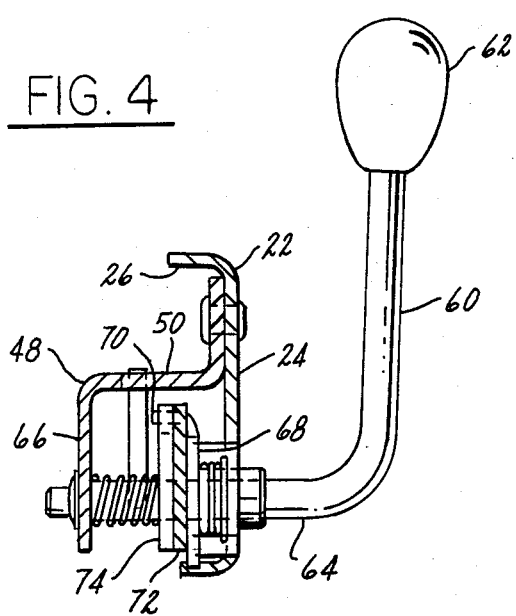
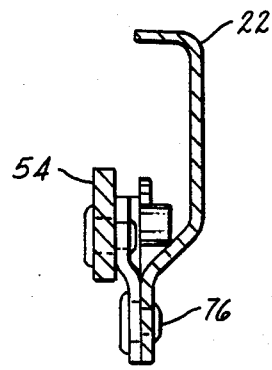
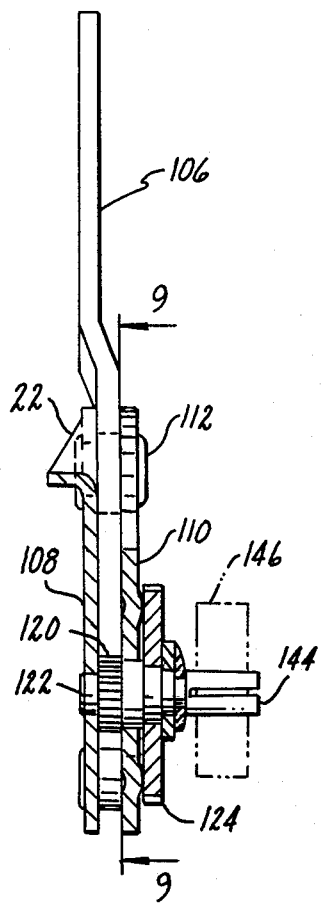
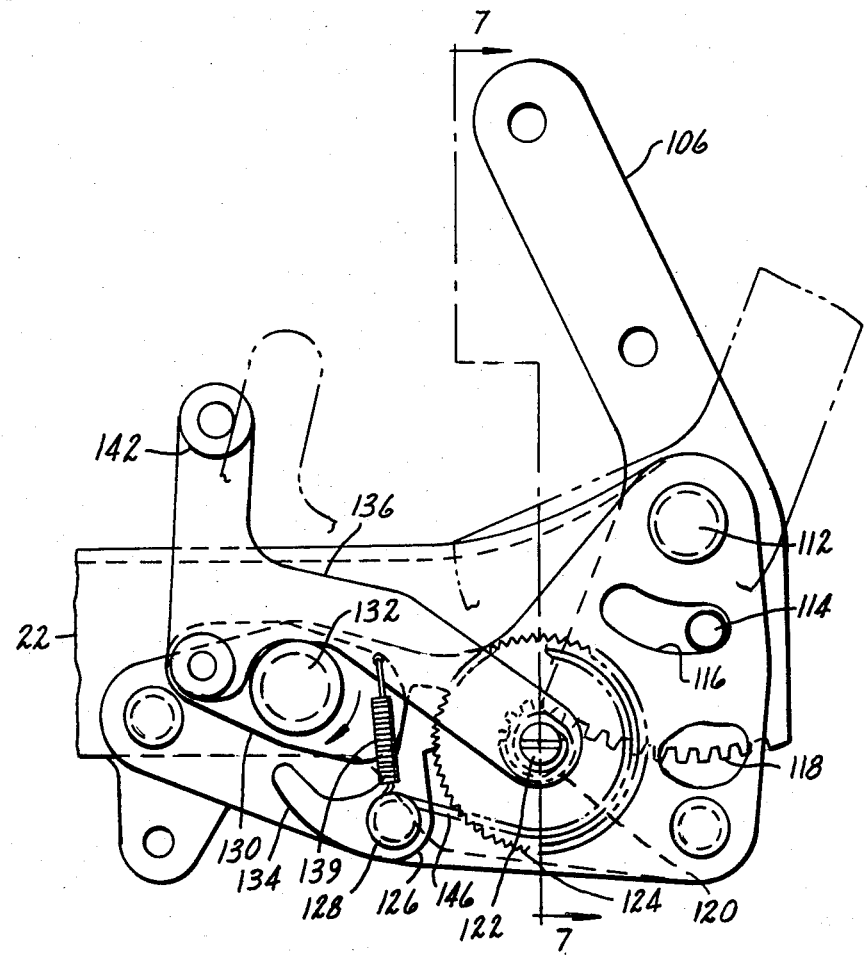

ADJUSTABLE SEAT CONSTRUCTION

PRIOR ART

Six-way seat adjustments are well known in the art and reference is made to assignee's prior applications Fudala Ser. No. 419,938, filed on Sept. 20, 1982 showing a similar vertical seat adjustment with provision for tilting and Ser. No. 387,222, filed June 10, 1982, showing a similar recliner adjustment mechanism.

BRIEF SUMMARY

The present invention relates primarily to an improvement in control means for a manually adjustable seat support which provides for independent vertical adjustment of the front and rear edges of a seat, thus providing for tilting as well as full vertical adjustment.

The seat adjustment is by pivoted bell crank levers having pivot connections at generally vertically movable portions for connection to the front or rear edge of the seat, and arms having generally horizontally movable portions for connection to pivoted pawl arms cooperating with a stationary rack to latch the seat in adjusted position.

To release the seat for manual vertical adjustment by the occupant, a vertically upwardly extending handle or lever is moved forwardly from an intermediate position in which both front and rear edges of the seat are in fixed position to a front release position. In this position the occupant of the seat leans back against the seat back which is locked at this time, to tilt the seat so as to move the front edge upwardly about a pivot support for the rear edge, or leans forwardly to depress the front edge. Similar adjustment of the rear edge is provided by moving the handle or lever rearwardly to release the rear seat edge for selective vertical adjustment, and the occupant controls the adjustment by pressure applied to the locked seat back.

BRIEF DESCRIPTION OF THE DRAWINGS

FIG. 2 is a side elevation of the seat.

FIG. 3 is a front elevation of the seat.

FIG. 4 is an enlarged fragmentary section on the line 4—4, FIG. 2, also seen in FIG. 1.

FIG. 5 is an enlarged fragmentary section on the line 5—5, FIG. 2, also seen in FIG. 1.

FIG. 6 is an enlarged detail view of the recliner latch.

FIG. 7 is a section on the line 7—7, FIG. 6.

DETAILED DESCRIPTION

Figure 1:
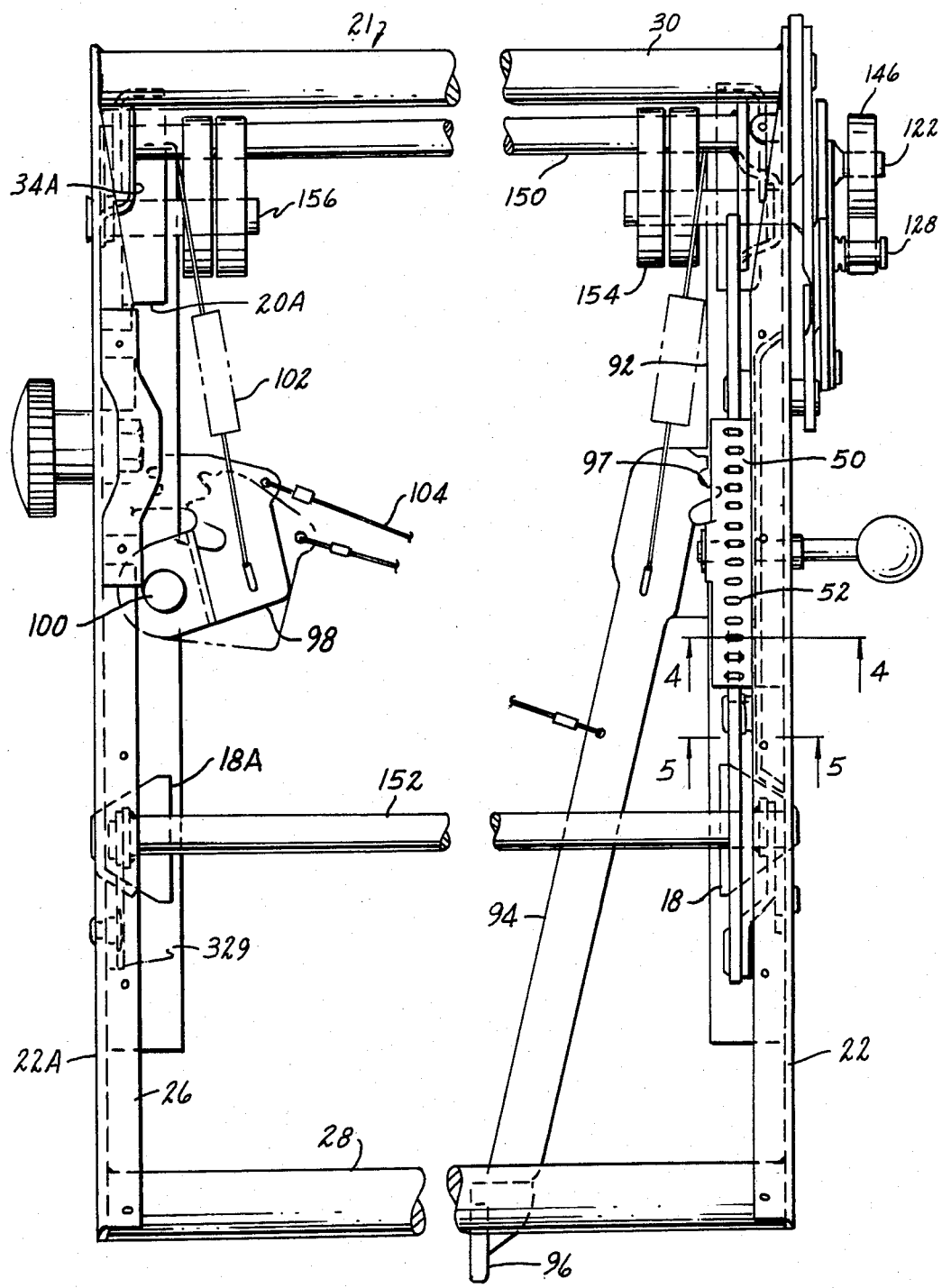
FIG. 1 is a plan view of the seat construction.

Referring now to the drawings, the seat assembly comprises a pair of elongated longitudinally extending tracks 10 adapted to be fixed to the floor or the passenger compartment of a motor vehicle. Tracks 10 are generally U-shaped and have laterally outwardly extending flanges 12. Elongated slides 14 are adjustable longitudinally of tracks 10. Slides 14 are of generally inverted U-shape with inturned bottom flanges 16. Antifriction rollers (not shown) are interposed between tracks 10 and slides 14.

A front post 18 is fixed to the forward end of each slide, and a rear post 20 is fixed to the rear end of each slide.

An integrated seat frame indicated generally at 21 in FIG. 2 comprises upper seat rails 22 formed of flat stock and comprising generally flat main portions 24 having the upper edge bent inwardly to form horizontal flanges 26. The front ends of elongated rails 22 are rigidly connected by cross-members 28 of tubular shape, and similar cross-members 30 interconnect the rear ends of the seat rails. The rails and cross-members thus form a rigid rectangular frame which may support a separate seat, or may constitute an integral part of a seat, by attachment of a flexible fabric support (not shown) to the inwardly extending flanges 26 of rails 22.

In any case, the frame is mounted for independent substantially vertical adjustment of its front and rear edges. Adjustment of either edge tilts the frame forwardly or rearwardly, and adjustment of both edges raises or lowers the entire seat frame.

The vertical adjustment of the seat frame is provided by front bell crank levers 32 and rear bell crank or lift levers 34 interposed between front posts 18 and rear posts 20, and the seat frame 21, respectively.

The front lever 32 is pivoted at 36 to seat rail 22 and at 38 to a short rigid link 40, which in turn is pivoted at 42 to post 18. The link is provided to prevent binding which would otherwise occur due to the fact that the front end of the seat during independent vertical adjustment, actually moves in an arc centered adjacent its rear edge. Accordingly, as the front edge of the seat is raised by force applied to the seat construction by the occupant, lever 32 pivots clockwise about pivot 38 while link 40 pivots a minor amount about pivot 42.

The rear lever is pivoted directly to rear post 20 at pivot 44 and is pivoted to seat rail 22 at pivot 46. When the rear edge of the seat is raised by force applied to the seat construction by spring 154 lever 34 pivots clockwise about its pivot connection 44 to rear post 20.

Figure 10:
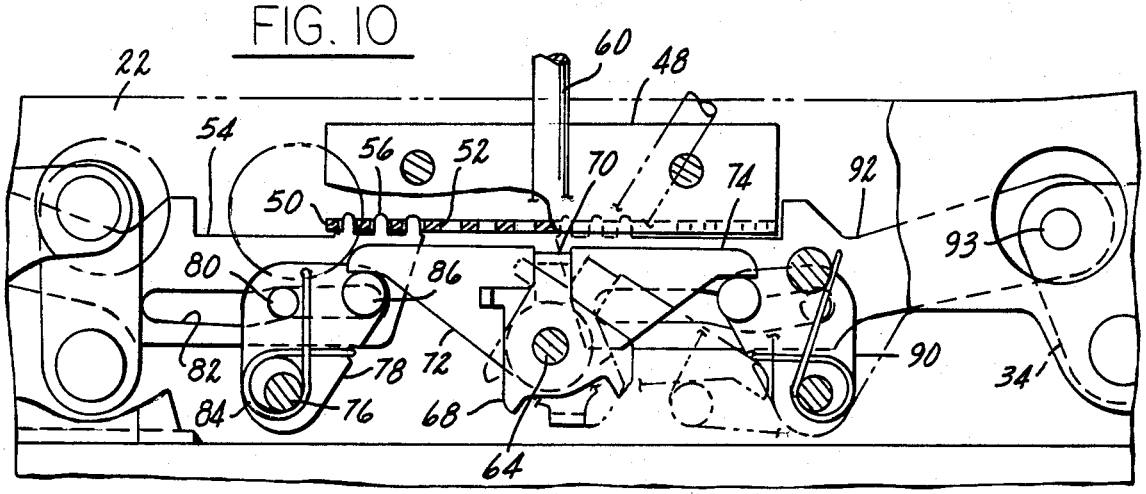
FIG. 10 is an enlarged fragmentary elevation showing the details of the vertical - tilting adjustment latch in full latch position.
Figure 11:
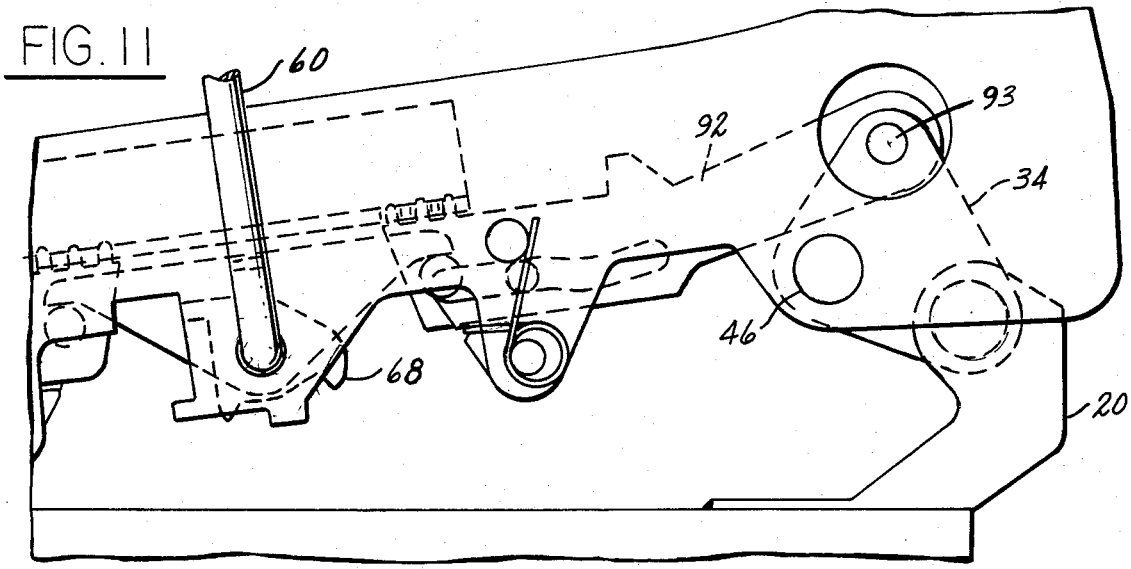
FIG. 11 is a view similar to FIG. 10 showing the rear of the assembly in its full upward adjustment—all latches engaged.

Manually releasable means are provided under control of the seat occupant to selectively lock the levers 32 and 34 in place, and hence to hold the seat frame including rails 22 in a selected position as to height and forward or rearward tilting. For this purpose a rack plate 48 is attached to the inner side of the outer seat rail 22 and includes a horizontal plate portion 50 provided with a series of openings 52, as best seen in FIG. 10. An elongated front pawl 54 having a series of pawl teeth 56 spaced and dimensioned to be received in openings 52 is pivotally connected by pivot 58 to front lever 32 and raising or lowering the front edge of the seat causes horizontal longitudinal movement of pawl 54. When pawl teeth 56 are located in openings 52, lever 32 is locked in fixed position and vertical adjustment of the front edge of the seat is prevented.

Manual release lever 60 having a knob 62 extends above the seat frame in position for easy manipulation by the occupant of the seat. Lever 60 has its lower end 64 bent to extend inwardly of the seat construction, where it is pivotally mounted between the vertical portion 24 of rail 22 and vertical portion 66 of rack plate 48, as best seen in FIG. 4. Attached to shaft portion 64 of lever 60 is a spring brake or operator 68 having a lug 70 and is movable from the double locking position seen in full lines in FIG. 10 to selectively rotate either a front actuator 72 or a rear actuator 74, both of which are mounted for pivotal movement on a round portion of shaft 64.

Pivoted at 76 to the seat rail is latch lever 78 having a pin projection 80 slidably received in an elongated slot 82 in front pawl 54. Latch lever 78 is biased counter-clockwise about pivot 76 by torsion spring 84 which biases lever 78 counter-clockwise, and through pin 80 and slot 82, biases the toothed end of pawl 54 upwardly to retain teeth 56 in blocking engagement with the openings in rack plate portion 50. Lever 78 has a rivet 86 whose head is engaged by actuator 72.

When manual lever 60 is swung forwardly from the full line position of FIG. 10, the lug 70 rotates actuator 72 counter-clockwise about pivot 64, which acts through rivet head 86 to rock latch lever 78 clockwise. Pin 80 in turn rocks pawl 54 clockwise about its pivot mounting 58, withdrawing its teeth from the opening in rack plate 50. This frees lever 32 for rocking movement about pivot 38. Since rear lever 34 remains locked, the front edge of the seat frame is movable generally vertically about rear pivot connection 46, the arcuate movement being accommodated by link 40. This movement of lever 32, if the front seat edge is raised, results in rearward movement of pawl 54. This adjustment is most effectively provided by forces applied to the set back, carried by arms 106, by the occupant of the seat. When the occupant releases lever knob 62, spring 84 restores pawl 54 to interlocked engagement with plate 50.

Adjustment of the rear edge of the seat frame generally vertically is similarly controlled by movement of lever 60 rearwardly, lug 70 at this time rocking rear actuator 74 clockwise to in turn rock rear latch lever 90 counter clockwise and to lower the forward end of rear pawl 92 to withdraw its teeth from plate 50 permitting its horizontal movement as required by its pivot connection 93 with lever 34.

Sequential adjustment of the front and rear edges of the seat frame 21 vertically in the same direction raises or lowers the seat frame, while adjustment of either edge vertically permits tilting the seat forwardly or rearwardly.

A second fore-and-aft horizontal adjustment at the seat is permitted by the movement of slides 14 on tracks 10. The slides are retained in adjusted position by a first manually controlled latch arm 94 having a finger piece 96 located forwardly of the front edge of the seat frame. Latch arm 94 is pivoted about a vertical axis to move latch teeth 97 into and out of latching engagement with a stationary elongated vertical plate having a series of openings (not shown) to latch the seat construction in adjusted position. A similar latch is provided at the inboard side of the seat, comprising the latch member 98 pivoted at 100 for movement between the latching position shown in full lines and the unlatched position shown in dotted lines. Tension springs 102 are provided to bias arm 94 and latch member 98 into latching position, and wire 104 connects them for simultaneous operation by lever 94.

Figure 8:
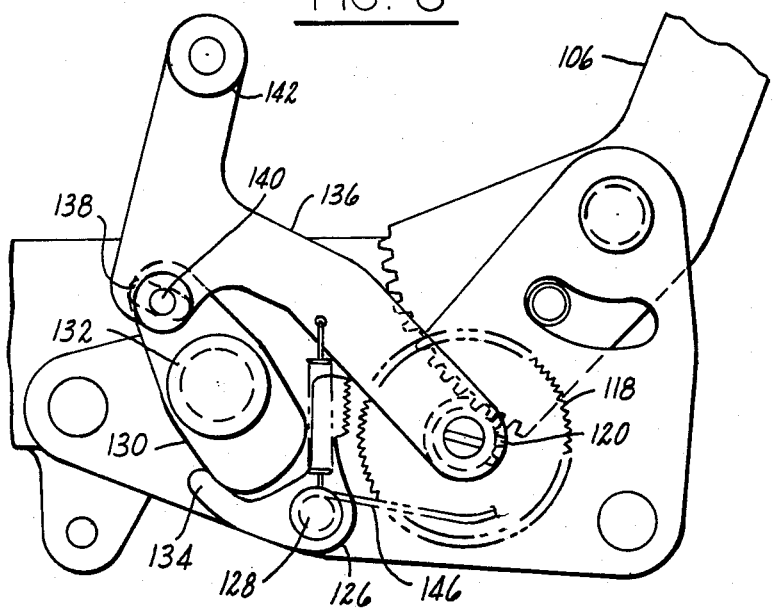
FIG. 8 is a view similar to FIG. 6, with seat back in reclining position.
Figure 9:
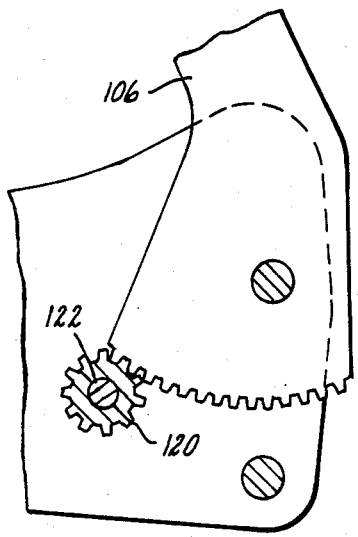
FIG. 9 is a fragmentary section on the line 9—9, FIG. 7.

An additional adjustment is provided in the seat construction which permits adjustment of a seat back (not shown), affixed to arms 106 which are pivoted between an integral rear portion of seat rail 22 which forms an inner mounting plate 108 and an outer mounting or cover plate 110. Arms 106 are pivoted at 112 and adjustment is limited by a pin 114 and slot 116. Arm 106 includes a toothed sector 118 having teeth in mesh with a small pinion 120 fixed to a rotatable shaft 122. A relatively large ratchet disk 124 is fixed to rotate with pinion 120. Pawl 126, pivoted to plate 110 at 128, has teeth engageable with ratchet 124 to retain the ratchet and hence pinion 120 against rotation. A cam 130, pivoted at 132 has a wedge locking portion engageable with the portion of pawl 126 opposite its teeth. Cam 130 and the surfaces on pawl 126 which it engages are shaped to have a locking angle such that forces applied to the pawl by the ratchet are ineffective to disengage the locking teeth. In addition, pawl 126 has a finger 134 engaged by cam 130 when the cam is moved to release position of FIG. 8 to effect positive withdrawal of the pawl teeth from the ratchet teeth.

Operating lever 136 is pivoted to shaft 122 and has an elongated slot 138 (FIG. 8) which receives a pin 140 carried by cam 130 effective to rotate the cam as lever 136 is raised to release the seat back for adjustment. Tension spring 139, anchored at one end at pivot mounting 128, is connected to lever 136 to bias it in a counter-clockwise direction. This in turn biases cam 130 to move pawl 126 into engagement with ratchet 124, and then to wedge lock the cam in locking engagement.

Lever 136 is provided with a handle 142 which extends laterally for convenient operation by the seat occupant.

Pivot shaft 122 is slotted as indicated at 144 for the reception of one end of a counterbalance spring 146, the other end of which abuts an extension on pawl pivot pin 128. The spring is selected to be effective to move the seat back to upright position, so that the occupant can readily position the seat back as desired.

It will be noted that the lock mechanism which retains the seat in the selected elevated and tilted position is provided at one side of the seat only. However, to insure smooth adjustment of the seat, posts and levers connecting the inboard rail designated 22A in FIG. 1 to posts 18A and 20A. The rear lever at the inboard side is designated 34A, and is similar to lever 34, except that the portion for connection to the locking pawl is omitted. A rigid torque tube 150 is welded at its ends to levers 34 and 34A, so that both levers are required to rotate in unison.

Similarly, at the front inboard end of the seat, a lever 32A is provided which is similar to lever 32 except that no connection for a latch pawl is provided. A rigid torque tube 152 is provided, welded at its ends to the links which connect the levers to the posts. Tube 152 ensures that the adjustable seat support mechanism at both sides of the seat operate identically.

The seat assembly as described is intended to be moved to adjusted position by forces applied to the seat and seat back by the occupant.

As previously described, the seat back is biased to upright position by spring means so that when the seat back latch is released, the occupant may move it rearwardly and downwardly by leaning back against the seat back. Similarly, when the seat back is to be adjusted forwardly and upwardly, the movement is controlled by the occupant opposing the spring biased movement by forces applied to the seat back.

The vertical and tilting adjustment of the seat are also provided for most convenient control by the seat occupant. Relatively strong clock springs 154 are carried by extensions 156 of the pins providing the pivot connections by rear posts 20, 20A and levers 34 and 34A, the seat, the outer ends of springs 154 engage torque tube 150, and the springs counterbalance the weight of the occupant on the seat by forces applied to the bell crank levers.

The height and tilt adjustments of the seat are accomplished specifically by tilting the seat in the proper direction about tilt adjustment axes adjacent the front and rear edges of the seat. When the rear lever 34 and 34A are released, the seat may be tilted rearwardly by forces applied by the seat occupant primarily to the seat back, which will be locked against movement relative to the seat. Springs 154 will elevate the rear of the seat to tilt the seat forwardly as permitted by force applied by the seat occupant primarily to the seat back.

When the front levers 32 and 32A are released, the seat may be tilted rearwardly by forces applied by the seat occupant primarily to the seat back, and may be tilted forwardly by the weight of the occupant applied to the front edge of the seat.

The complete seat assembly as described in the foregoing provides for adjustment of the seat longitudinally of the vehicle, tilting of the seat forwardly or rearwardly, adjustment of the seat vertically, and adjustment of the seat back between upright and reclining position, all in conjunction with controls readily operated by the seat occupant to permit adjustment and to effect positive locking of the seat and seat back in adjusted position.

Tilting adjustment of the seat for the most part is facilitated by forces applied to the seat back by the occupant of the seat, which, of course, requires that the seat back is in locked position. In addition counterbalance springs are effective to raise the rear of the seat when the rear seat lock is released, and the seat occupant controls this adjustment by forces applied to the seat back.

Conversely, of course, adjustment of the seat back is accomplished while both the seat locking means including the bell crank levers and the lower support slides 14 are locked. Spring 146 is effective to move the seat back to upright position when the seat back lock is released, and the seat occupant controls this adjustment by forces applied to the seat back.

Finally, forward horizontal longitudinal adjustment of the seat on tracks 10 is preferably assisted by a spring diagrammatically indicated at 150 in FIG. 3, acting between the tracks 10 and the slides 14 or structure carried thereby. Control of this adjustment by the seat occupant is by forces applied to the seat and more particularly to the seat back, so that this adjustment requires that both the seat locks against vertical adjustment and the seat back locks are in locked condition.

From the foregoing it will be apparent that manual adjustment of the seat and seat back is generally spring assisted, and that control of both seat raising and lowering and tilting, and seat back inclining is in general by forces applied by the seat occupant rearwardly against the seat back. Thus, upward movement of the front edge of seat frame is by tilting of the seat frame about a transverse axis adjacent the rear of the seat frame determined by the pair of locked bell crank levers connected to the rear edge of the seat frame by forces applied rearwardly to the locked seat back when the front pair of bell crank levers are released. Vertical movement of the rear edge of the seat frame is by tilting of the seat frame about a transverse axis adjacent the front edge of the seat frame determined by the pair of locked bell crank levers connected to the front edge of the seat frame by the resilient counterbalance spring means connected the rear pair of bell crank levers, as controlled by forces applied rearwardly to the locked seat back by the seat occupant. Adjustment of one pair of bell crank levers provides a tilting adjustment of the seat and adjustment of both pairs of levers provides raising or lowering of the seat. With all bell crank levers locked, the seat back is movable rearwardly against the bias of its counterbalance spring means by forces applied thereto by the seat occupant, and is movable forwardly by the spring means as controlled by forces applied rearwardly to the seat back by the seat occupant.

We claim:

1. An adjustable seat assembly comprising a lower support, a rigid rectangular seat frame, front and rear bell crank levers pivotally connected between said support and the front and rear respectively of said frame, said bell crank levers being pivotal on said frame as a consequence of substantially vertical movement of the adjacent edge of said frame, an elongated longitudinally extending rack plate having a series of openings therein fixed to said frame, elongated longitudinally extending, longitudinally slotted front and rear pawls pivotally connected at one end to corresponding bell crank levers and having teeth at their other ends receivable in the openings in said rack plate, a manually operable control lever having an inwardly extending end pivotal on said frame to provide for pivotal movement of said control lever forwardly and rearwardly from an intermediate position in which both bell cranks are locked against pivotal movement, an operator fixed to said control lever having a lug thereon, front and rear actuators pivoted for independent movement on the inwardly extending end of said control lever engaging said lug, front and rear latch levers pivoted to said frame for independent movement about transverse axes by said actuators, said latch levers having projections thereon receivable in the slots in said pawls and operable to swing the toothed end of the corresponding pawl to disengage its teeth from the openings in said rack plate, the elongated slots in said pawls providing for longitudinal movement thereof on pivotal movement of the associated bell crank levers.

2. An assembly defined in claim 1, comprising resilient means biasing said latch levers for pivotal movement in the direction to urge the toothed ends of said pawls into engagement with said rack plate and to restore said control lever to intermediate position.

3. An assembly defined in claim 1, which comprises counterbalance springs connected to the bell crank levers at the rear of said seat frame effective to raise the rear edge of the seat frame.

4. An assembly defined in claim 3, which comprises a seat back pivoted at its lower edge to the rear of seat frame, manual seat back locking means selectively locking said seat back in adjusted position or releasing said seat back for adjustment, resilient means connected to said seat back effective to permit movement of said seat back to rearwardly inclined position by forces applied thereto by a seat occupant, and to move said back from rearwardly inclined position to erect position under control of rearwardly directed forces applied thereto by a seat occupant, whereby full adjustment of the seat both as to seat height, seat inclination, and seat back tilting is effected by the resilient means controlled essentially by forces applied rearwardly against the seat back by the seat occupant.

* * * * *